(12) United States Patent
Toombs

(10) Patent No.: US 8,152,107 B1
(45) Date of Patent: Apr. 10, 2012

(54) APPLYING SEALANT TO NARROW DEEP GAPS IN AN ABLATIVE HEAT SHIELD SURFACE

(75) Inventor: Gordon R. Toombs, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 1138 days.

(21) Appl. No.: 12/033,739

(22) Filed: Feb. 19, 2008

(51) Int. Cl.
*B64G 1/58* (2006.01)

(52) U.S. Cl. ...................... 244/159.1; 156/285

(58) Field of Classification Search ............... 244/159.1, 244/131, 132, 133; 156/285–286; 222/566
See application file for complete search history.

(56) References Cited

U.S. PATENT DOCUMENTS

| | | | | |
|---|---|---|---|---|
| 4,151,800 A * | 5/1979 | Dotts et al. | ................... | 244/159.1 |
| 5,213,828 A * | 5/1993 | Winter et al. | ................... | 156/107 |
| 5,511,747 A * | 4/1996 | Parrot et al. | ................... | 244/159.1 |
| 6,255,142 B1 * | 7/2001 | Babiarz et al. | ................ | 438/126 |
| 6,514,797 B2 * | 2/2003 | Chee et al. | ..................... | 438/127 |
| 6,592,981 B1 * | 7/2003 | Rawal et al. | ................ | 244/159.1 |
| 7,070,673 B2 * | 7/2006 | Stadtlander | ................... | 156/286 |
| 7,198,860 B2 * | 4/2007 | Vance | ............................ | 428/701 |
| 7,377,469 B2 * | 5/2008 | Cherian | ..................... | 244/159.1 |
| 7,645,406 B2 * | 1/2010 | Kilwin et al. | ................. | 156/286 |
| 2001/0048198 A1 * | 12/2001 | Dulin | ............................. | 277/316 |
| 2007/0292654 A1 * | 12/2007 | Bohner et al. | ................... | 428/76 |

FOREIGN PATENT DOCUMENTS

GB    2339546    * 2/2000

OTHER PUBLICATIONS

"Boeing Completes Prototype Heat Shield for NASA Orion Spacecraft," http://boeingmedia.com/imageDetail.cfm?id=15034& clr=release (Nov. 13, 2007).
http://www.space-travel.com/reports/Boeing_Completes_Prototype_Heat_Shield_For_NASA_Orion_Spacecraft_999.html (Nov. 14, 2007).

* cited by examiner

*Primary Examiner* — Galen Barefoot

(57) ABSTRACT

A method of applying sealant to a narrow, deep gap in a surface includes covering the gap to form a covered channel, inserting a flared end of a dispensing nozzle into the covered gap at a first location, and applying a vacuum to the covered gap at a second location while using the nozzle to inject the sealant into the gap at the first location. This method may be used to seal gaps between ablative elements of a heat shield.

10 Claims, 5 Drawing Sheets

FIG. 1
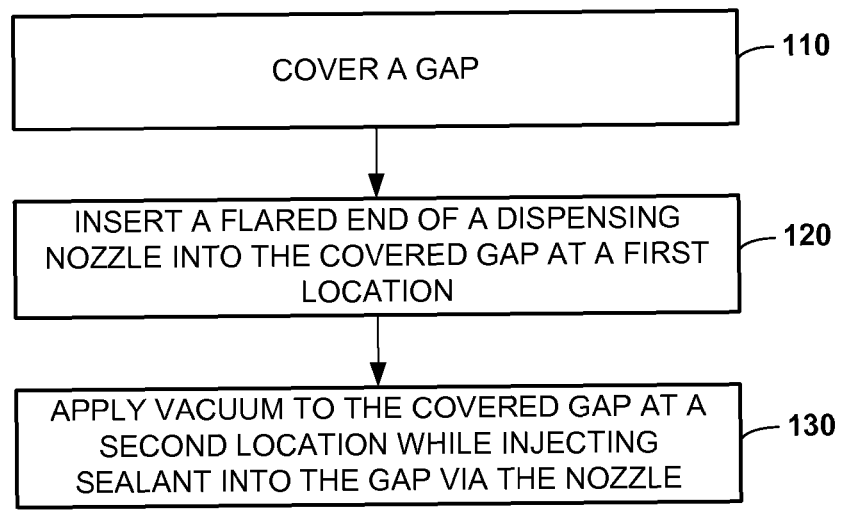
- 110 COVER A GAP
- 120 INSERT A FLARED END OF A DISPENSING NOZZLE INTO THE COVERED GAP AT A FIRST LOCATION
- 130 APPLY VACUUM TO THE COVERED GAP AT A SECOND LOCATION WHILE INJECTING SEALANT INTO THE GAP VIA THE NOZZLE
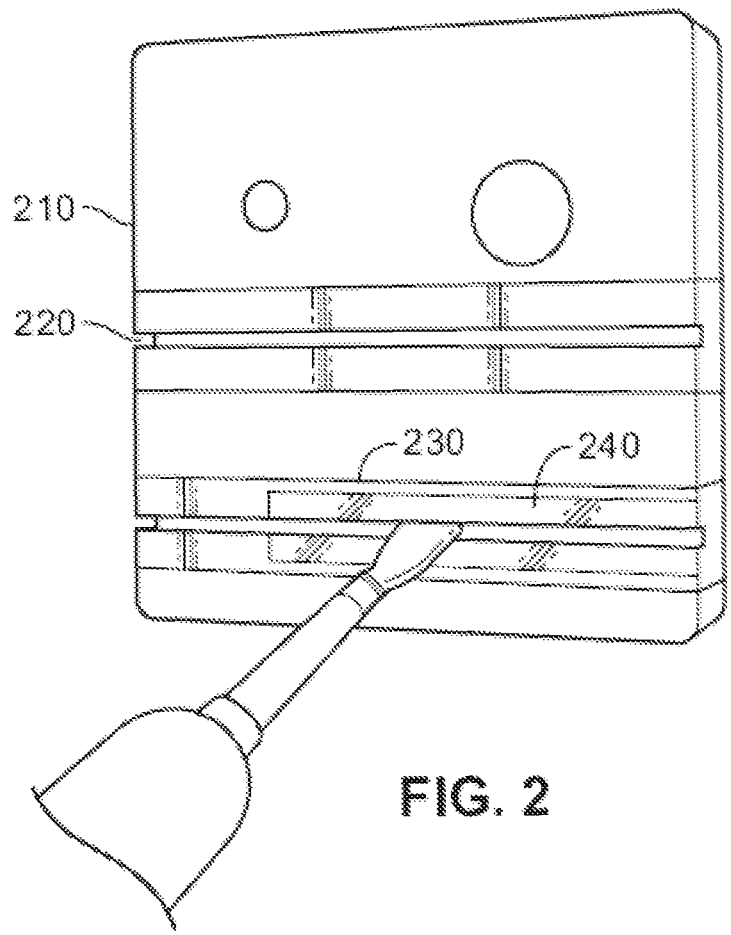
FIG. 2

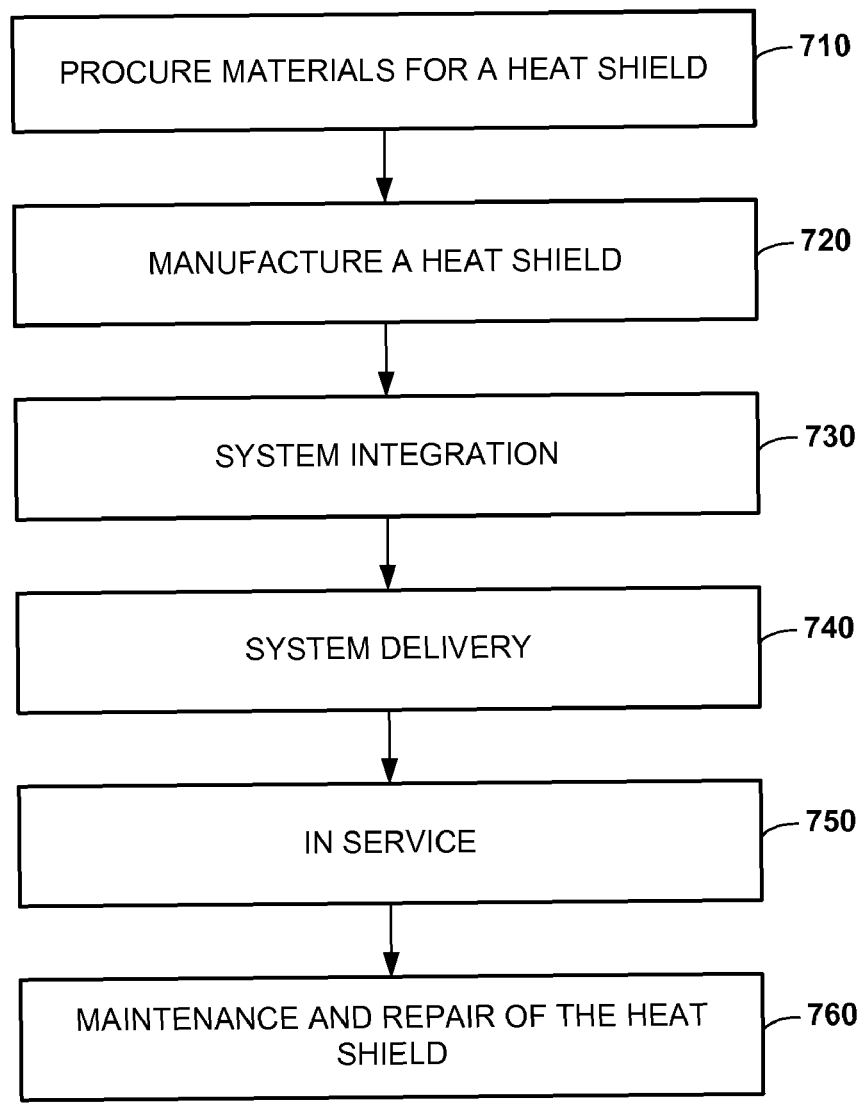

APPLYING SEALANT TO NARROW DEEP GAPS IN AN ABLATIVE HEAT SHIELD SURFACE

BACKGROUND

NASA's Orion Crew Exploration Vehicle (CEV) is designed to carry a crew and payload to Earth orbit and beyond. The CEV includes a capsule for holding a crew, a service module, and a booster for lift-off into Earth orbit.

The CEV capsule has an ablative aft heat shield for protecting the crew from extreme heat during re-entry into Earth's atmosphere. The heat shield is formed from heat-absorbing elements that are bonded to a structural substrate. The heat-absorbing elements are separated by a gap having a nominal thickness of 0.080±0.020 inches. The gaps are filled with a thixotropic sealant to prevent hot gases from reaching the capsule skin during re-entry. The current CEV heat shield has about 3000 inches of gaps to be filled.

During construction of a thermal protection system (TPS) manufacturing demonstration unit (MDU), a steel metal syringe needle was used to inject sealant into the gaps. The needle was attached to a pneumatic extrusion gun, which utilized polypropylene tubes filled with sealant. The extrusion gun was charged with (pressurized) plant air, the needle was inserted into a gap, and the extrusion gun injected the sealant through the needle and into the gap.

Filling all 3000 inches is a very slow process. The orifice opening of the needle restricts the flow and volume of the sealant into the gaps. An 18 gage syringe needle has been found to dispense the sealant at a rate of about 0.4 inches per minute. An 18 gage syringe needle has been found to take about 105 minutes to fill a 42 inch long gap having a nominal width of 0.080 inches and a nominal depth of about 4.2 inches. Filling all 3000 inches of gaps can take over 7500 minutes.

This slow process can affect a production schedule. And since the gaps are filled by manual labor, extra time filling the gaps can add to production costs.

It would be beneficial to increase the speed of filling and/or sealing the gaps with sealant.

SUMMARY

In one embodiment, a method of applying sealant to a narrow, deep gap in a surface includes covering the gap to form a covered channel, inserting a flared end of a dispensing nozzle into the covered gap at a first location, and applying a vacuum to the covered gap at a second location while using the nozzle to inject the sealant into the gap at the first location. This method may be used to increase the speed of filling and/or sealing gaps between ablative elements of a heat shield.

BRIEF DESCRIPTION OF THE DRAWINGS

FIG. 1 is an illustration of a method.
FIG. 2 is an illustration of a surface having a gap that is taped.
FIG. 7 is an illustration of a method for a spacecraft.

DETAILED DESCRIPTION

Figure 3:
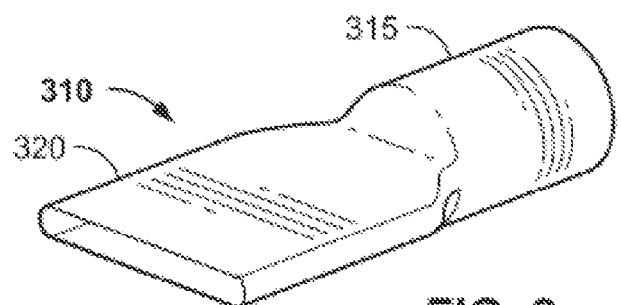
FIG. 3 is an illustration of a nozzle.

Reference is made to FIG. 1, which illustrates a method of injecting large volumes of sealant into a narrow, deep gap in a hard, surface. The surface may be non-porous (preferred) or porous. The sealant may be a thixotropic sealant, or it may be a sealant having the viscosity or other properties of a thixotropic sealant, or it may be some other suitable sealant. Certain room temperature vulcanizing (RTV) sealants (e.g., RTV 560) have such properties.

At block 110, the gap is covered to form a covered channel. For instance, the gap may be covered by tape. Each side of the gap may be masked (e.g., with a medium to high tack adhesive masking tape) to reduce contamination of the surface. The surface of the masking tape may then be abraded with non-metallic paddles to apply good adhesion. Transparent tape that is impervious to the sealant (e.g., acrylic tape) may then be applied evenly over the masking tape.

The gap may be taped as illustrated in FIG. 2. A surface is referenced by numeral 210, a gap in the surface 210 is referenced by numeral 220, masking tape is referenced by numeral 230, and transparent tape is referenced by numeral 240.

Reference is once again made to FIG. 1. At block 120, a flared end of a dispensing nozzle is inserted into the covered gap at a first location. For example, a slit may be made in the transparent tape at the first location, and the flared end of the nozzle is inserted through the slit and into the gap. The nozzle may be used with an extrusion gun to inject the sealant into the gap.

Reference is made to FIG. 3, which illustrates an exemplary dispensing nozzle 310 having a flared end 320. The flared end 320 gives the nozzle 310 a large dispensing area. The large dispensing area allows the sealant to be dispensed at a far higher rate than a metal syringe. However, a drawback of the high rate is that voids (i.e., air bubbles) can form in the sealant.

Reference is once again made to FIG. 1. At block 130, a vacuum is applied to the gap at the second location while using the nozzle to inject the sealant into the gap at the first location. The vacuum may be applied by making a slit in the transparent tape at the second location, and inserting a suction hose through that slit. In the alternative, a vacuum bag may be used to apply a vacuum at the second location. The vacuum assists the extrusion process, ensuring that the sealant flows through and at least substantially fills the covered gap, from the first location of the gap to the second location. Not only does the vacuum assist the extrusion, but it also removes air voids in the sealant, thereby improving the quality of the resulting seal.

The transparent tape ensures a tight seal and thus promotes the application of vacuum during gap filling. The transparent tape also helps prevent the overflow of sealant along the outer mold line of the gap. And because the tape is transparent, the level of sealant in the gap can be observed as the gap is being filled.

Figure 4:
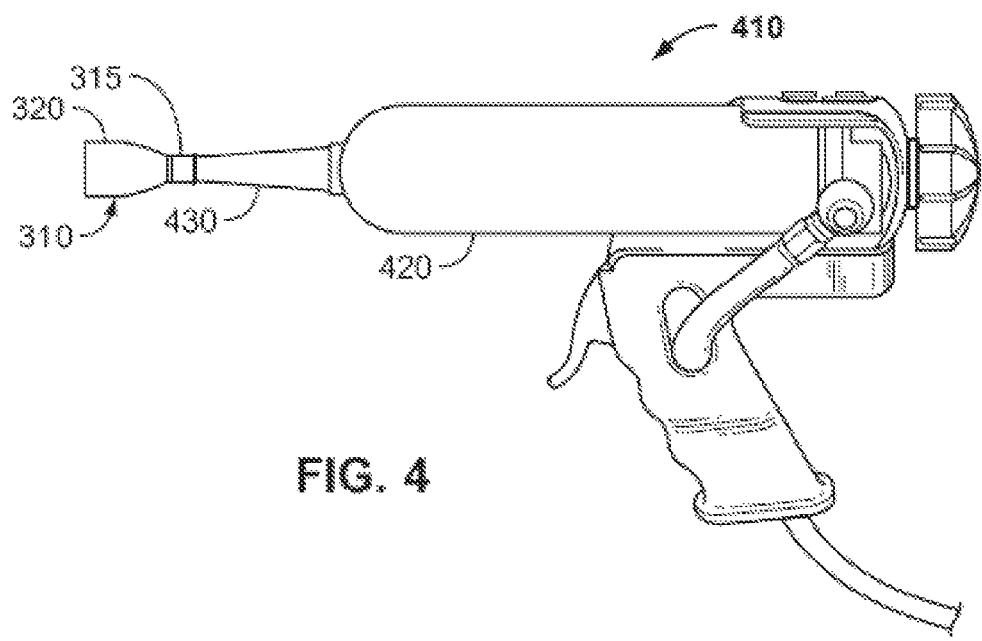
FIG. 4 is an illustration of an apparatus.

Reference is made to FIG. 4, which illustrates an apparatus 410 for injecting the sealant. The apparatus 410 includes the nozzle 310 and a pneumatic extrusion gun 420 for dispensing a cartridge of sealant. For instance and without limitation, the extrusion gun 420 may be a SEMCO® pneumatic extrusion gun. In FIG. 4, only the nozzle 430 of the cartridge is visible.

A first end 315 of the dispensing nozzle 310 conforms to and is secured to the tip of the cartridge nozzle 430. This prevents sealant from leaking out of the first end 315 of the dispensing nozzle 310 as the extrusion gun 420 injects sealant into the dispensing nozzle 310.

A second (flared) end 320 of the dispensing nozzle 310 provides an injection area that is much wider than that of an 18 gauge needle. The flared end 320 is also elongated. In addition, the second end is made of a thin, flexible material that expands as the sealant flows through. These properties allow the flared end 320 of the dispensing nozzle 310 to be inserted into a very narrow, yet deep gap. Actual length and width of the elongated flared end 320 will depend upon the dimensions of the gap that will be filled.

In some embodiments, the dispensing nozzle 310 and cartridge nozzle 430 could be integrated to form a single nozzle. In other embodiments, the dispensing nozzle 310 and cartridge nozzle 430 could be separate pieces.

In some embodiments, the dispensing nozzle 310 may be made of polyolefin or other thin wall shrink tubing or shrink wrap material. A shrink ratio of at least 2:1 allows the first end 315 of the dispensing nozzle 310 to be reduced to fit tightly over the cartridge nozzle 430. The first end 315 may then be clamped to the cartridge nozzle 430 (e.g., by a wire clamp). The second end 320 of the dispensing nozzle 310 is not heated, so that its original width is not reduced. The second end 320 of the dispensing nozzle 240 may be flared simply by flattening the second end 320. An advantage of using shrink tubing is that the dispensing nozzle 310 can be custom-fitted to the extrusion gun 420 and the gap.

A method and dispensing nozzle described herein are not limited to any particular application. For instance, one application involves sealing gaps in an aircraft. A method and dispensing nozzle described herein may be used to seal gaps in a fuselage (e.g., fuselage splices such as a lap splice) or gaps in wing splices or other gaps in other components. Another application involves sealing a heat shield of a spacecraft.

Figure 6:
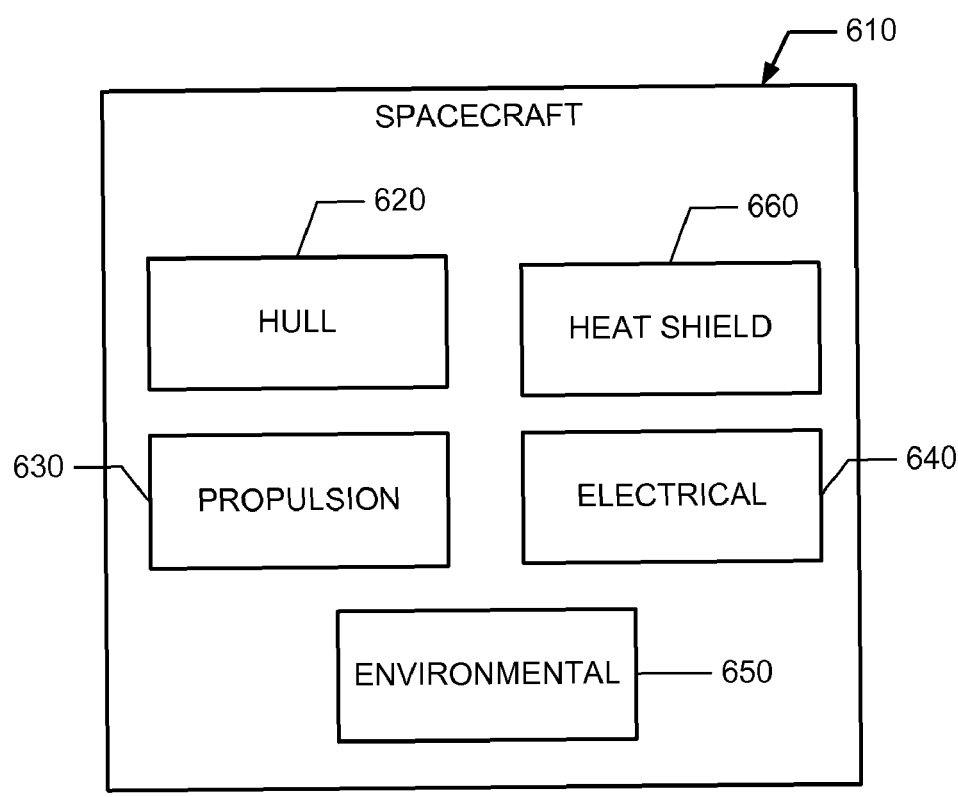
FIG. 6 is an illustration of a spacecraft.

Reference is made to FIG. 6. A spacecraft 610 includes standard components such as a hull 620, propulsion system 630, electrical system 640, and environmental system 650. The spacecraft 610 also includes a heat shield 660.

Figure 5:
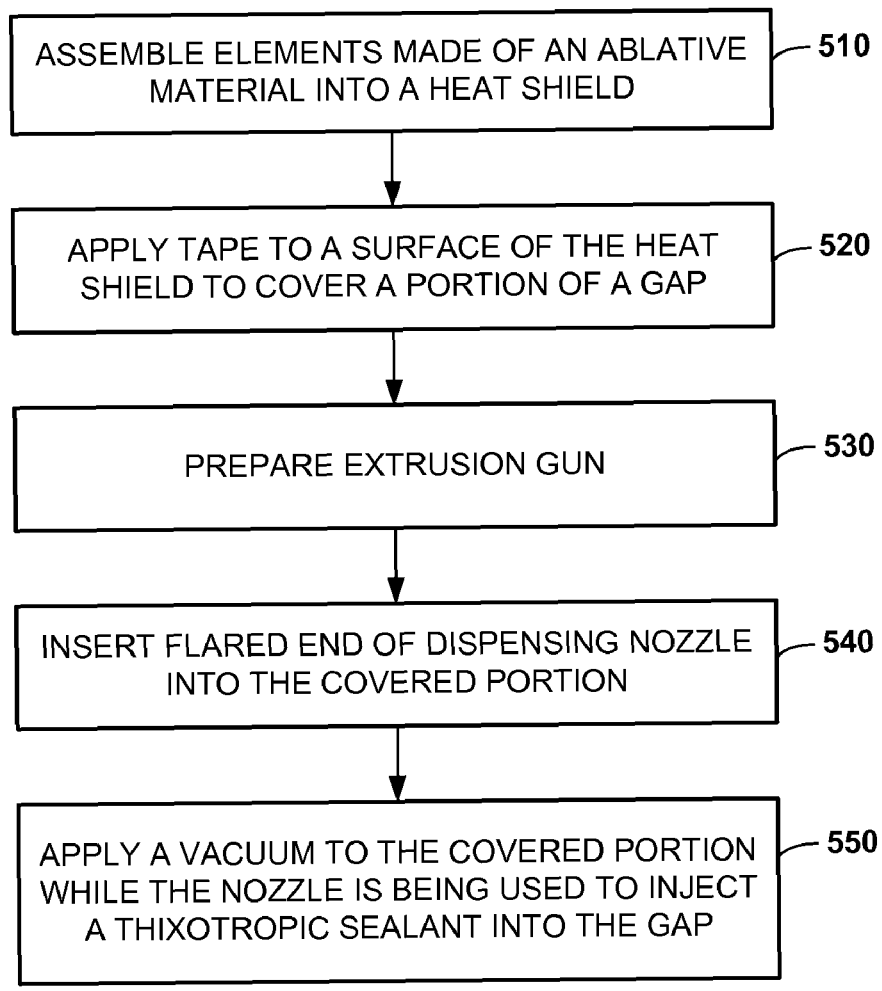
FIG. 5 is an illustration of a method.

Reference is now made to FIG. 5. At block 510, elements made of an ablative material are assembled into a heat shield. In some embodiments, the ablative material may be a phenolic impregnated carbon ablator (PICA).

The elements form long, narrow, deep gaps. In some embodiments of the heat shield, the gaps may have a width of 0.080±0.020 inches and a depth of about four inches.

The gaps will be sealed with a thixotropic sealant. The gaps may be sealed in portions. At least some of the portions may be sealed as follows.

At block 520, tape is applied to a surface of the heat shield to cover a portion of a gap. The tape may protect the surface against contamination and promote the application of a vacuum. Small slits may be introduced in first and second locations above a covered gap. The slit at the first location is for nozzle insertion. The slit at the second location, which is downstream of the first location, is for a vacuum source tube. As an example, the distance between the slits introducing the nozzle and the vacuum source tube may be approximately 18-20 inches apart. However, the actual distance is application-specific.

At block 530, an extrusion gun is prepared. The extrusion gun is loaded with a cartridge of thixotropic sealant. A dispensing nozzle is attached to the cartridge (if it is not integrated with the cartridge nozzle). The extrusion gun is also connected with a source of pressurized air. The pressurized air may be regulated (e.g., 50 psi) to prevent the flared end of the dispensing nozzle from swelling.

At block 540, the flared end of the dispensing nozzle is inserted into the gap via the slit at the first location.

At block 550, a vacuum is applied to the gap at the second location, while the nozzle is being used to inject the sealant into the gap at the first location. The vacuum causes the sealant to flow through the covered gap. The vacuum also removes voids from the sealant. For a gap having a width of 0.080±0.020 inches and a depth of about four inches, a thixotropic sealant can be dispensed at a rate of about two inches per minute. The resultant seal is virtually void free which leads to better end product performance. Thus, the gap is filled at a far greater rate than with a needle alone, and the sealant installation is of a higher quality.

Reference is now made to FIG. 7, which illustrates a method for a spacecraft. At block 710, materials for a heat shield are procured. The materials include the ablative elements, structural substrate and sealant.

At block 720, the heat shield is manufactured. The heat shield may be manufactured as illustrated in FIG. 5 by the system integrator or by a subcontractor.

At block 730, the heat shield is integrated with the rest of the spacecraft. At block 740, the spacecraft is delivered to a customer.

At block 750, the heat shield is placed in service. While in service, the heat shield will be subjected to extreme temperatures.

At block 760, maintenance and repair can be performed on the heat shield. During maintenance and repair, the method of FIG. 1 can be used to reseal or repair the heat shield.

The invention claimed is:

1. A method comprising:
    assembling a plurality of ablative elements into a heat shield of a spacecraft, wherein the elements form long, narrow, deep gaps there between;
    sealing the gaps between the ablative elements with a thixotropic sealant, wherein sealing a portion of the gap includes
    applying tape to a surface of the heat shield to cover the gap portion;
    inserting a flared end dispensing nozzle into the covered portion; and
    applying a vacuum to the covered portion downstream of the flared end nozzle, the vacuum applied while using the nozzle to inject the sealant into the gap, the vacuum causing the sealant to flow through the covered gap portion, the vacuum also removing voids from the sealant in the gap.

2. The method of claim 1 wherein an extrusion gun is used to inject the sealant into the nozzle, whereby the sealant flows out of the flared end nozzle, into the gap.

3. The method of claim 1 wherein the gap has a nominal thickness of 0.080+−0.020 inches.

4. The method of claim 1, wherein the dispensing nozzle is made of a shrink fit material, the method further comprising shrink-fitting a first end of the nozzle onto an extrusion gun and flattening the other end of the nozzle to form the flared end prior to inserting the flared end into the gap; and using the extrusion gun to inject the sealant through the nozzle and into the gap.

5. The method of claim 4, wherein dispensing nozzle is made of a material having a shrink ratio of at least 2:1.

6. The method of claim 1, wherein the gap is formed with a nominal thickness of 0.080+−0.020 inches and a depth of about 4 inches.

7. A spacecraft comprising a heat shield manufactured according to the method of claim 1.

8. The method of claim 1, wherein using the nozzle includes using a sealant cartridge to inject the sealant into the nozzle, the nozzle including a nozzle body of thin wall shrink tubing material having first and second ends, the first end having been shrink fitted to a nozzle of the sealant cartridge, the second end having been flattened into a flared, elongated end.

9. The method of claim 1, wherein the vacuum and the flared end of the nozzle are spaced apart along a length of the gap portion.

10. The method of claim 1 wherein applying the tape from one side of the gap to an opposite side of the gap.

* * * * *